US012249471B1

(12) United States Patent
Prieur et al.

(10) Patent No.: US 12,249,471 B1
(45) Date of Patent: Mar. 11, 2025

(54) POWER CONTACTOR COMPRISING A PYROTECHNIC ACTUATOR

(71) Applicant: SAFRAN ELECTRICAL & POWER, Blagnac (FR)

(72) Inventors: Guillaume Prieur, Blagnac (FR); Cecil Beltan, Blagnac (FR); Kévin Enouf, Blagnac (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 0 days.

(21) Appl. No.: 18/726,247

(22) PCT Filed: Jan. 2, 2023

(86) PCT No.: PCT/FR2023/050005
§ 371 (c)(1),
(2) Date: Jul. 2, 2024

(87) PCT Pub. No.: WO2023/135380
PCT Pub. Date: Jul. 20, 2023

(30) Foreign Application Priority Data

Jan. 12, 2022 (FR) ...................................... 2200226

(51) Int. Cl.
*H01H 39/00* (2006.01)
*H01H 3/26* (2006.01)

(52) U.S. Cl.
CPC .............. *H01H 39/00* (2013.01); *H01H 3/26* (2013.01)

(58) Field of Classification Search
CPC ...... H01H 39/00; H01H 89/00; H01H 50/546; H01H 51/065
See application file for complete search history.

(56) References Cited

U.S. PATENT DOCUMENTS 4,168,480 A * 9/1979 De Lucia ............... H01H 50/54 218/155
2019/0108957 A1* 4/2019 Volkmann ............ H01H 39/006
(Continued)

FOREIGN PATENT DOCUMENTS

DE 102018206056 7/2019
FR 3101478 A1 4/2021

OTHER PUBLICATIONS

Search Report and Written Opinion issued in International Application No. PCT/FR2023/050005, issued Apr. 13, 2023.

*Primary Examiner* — Kyung S Lee
(74) *Attorney, Agent, or Firm* — Bookoff McAndrews, PLLC

(57) ABSTRACT

A power contactor including: a fixed part; a movable part able to come into contact with the fixed part and to move between an open position and a closed position of the contactor, the movable part including at least one power contact; an auxiliary contact and a pyrotechnic actuator, the auxiliary contact and the pyrotechnic actuator being placed in parallel with the power contact, and the pyrotechnic actuator being configured to be triggered during a levitation of the contactor in such a way as to move the contactor into the open position; and a motor configured to actuate the movable part and to put it in contact with the fixed part characterized in that the power contact and the auxiliary contact are desynchronized in such a way that when the contactor is closed, the power contact comes into contact with the fixed part before the auxiliary contact.

5 Claims, 4 Drawing Sheets

(56) References Cited

U.S. PATENT DOCUMENTS

| | | | | |
|---|---|---|---|---|
| 2020/0279711 | A1* | 9/2020 | Mathieu | H01H 85/0039 |
| 2021/0142969 | A1* | 5/2021 | Bush | F15B 15/19 |
| 2021/0166901 | A1 | 6/2021 | Cacciatore et al. | |

* cited by examiner

[Fig. 1A]
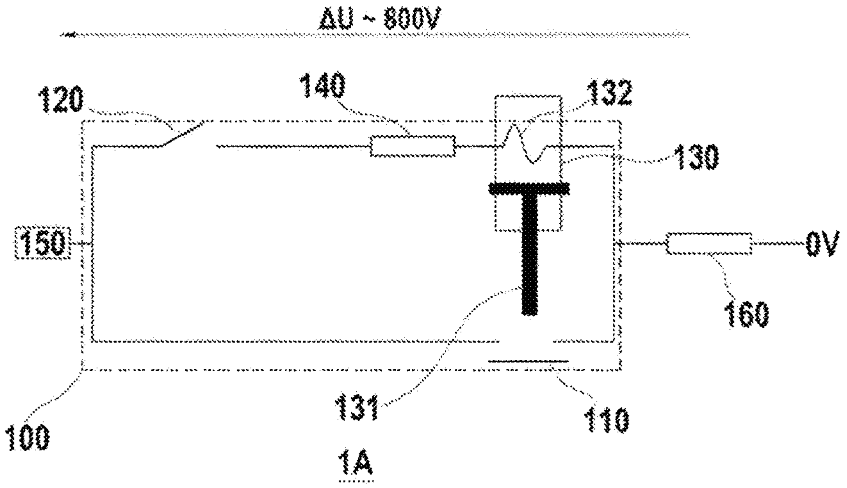
[Fig. 1B]
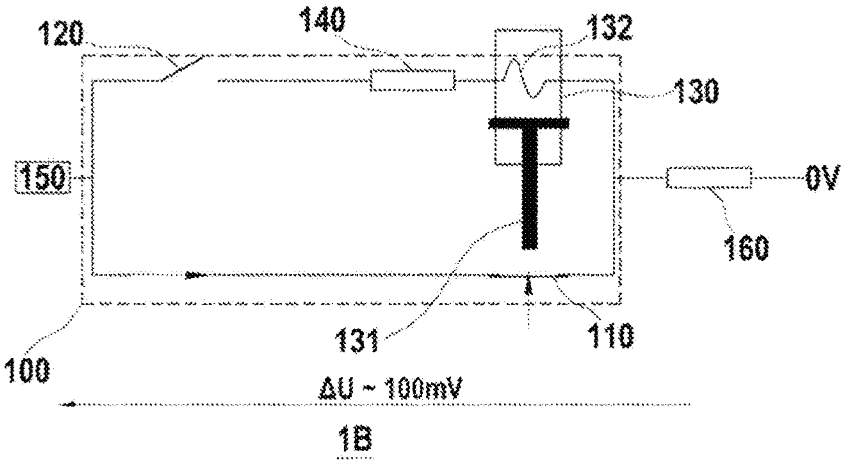

[Fig. 1C]
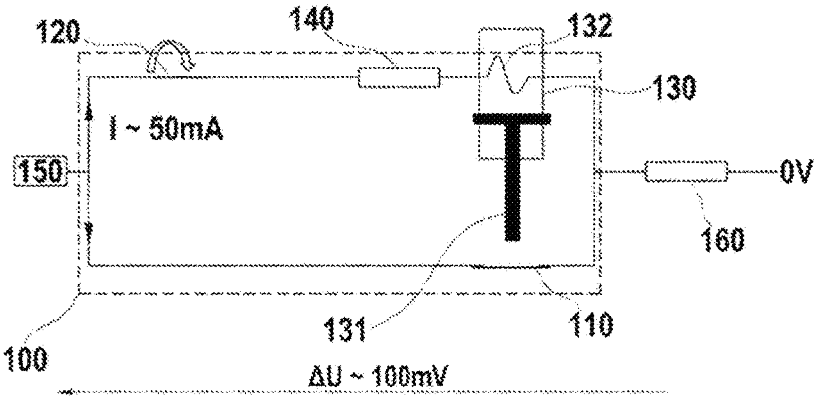
1C
[Fig. 1D]
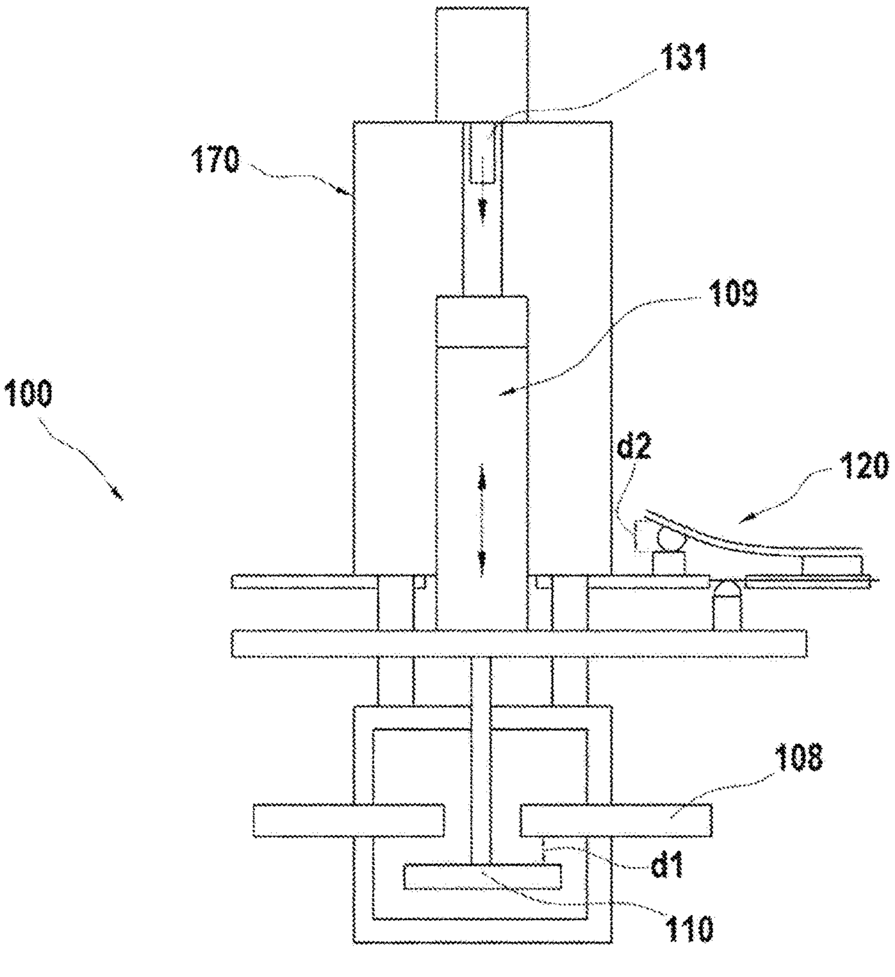

[Fig. 2]
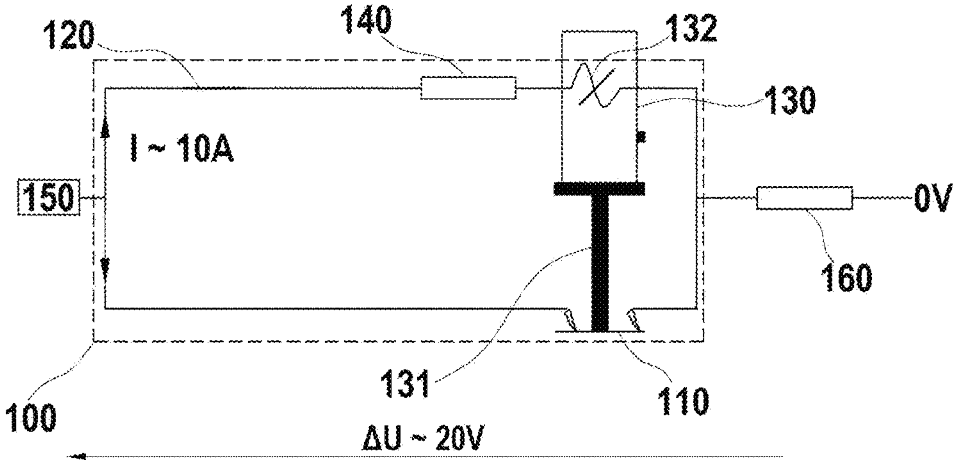

[Fig. 3]
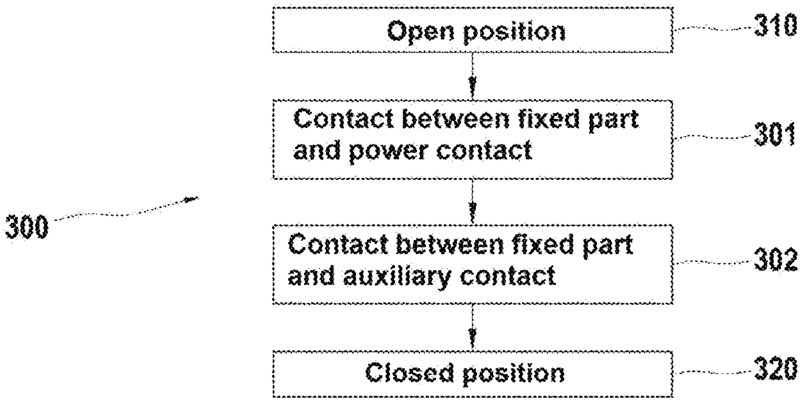
[Fig. 4]
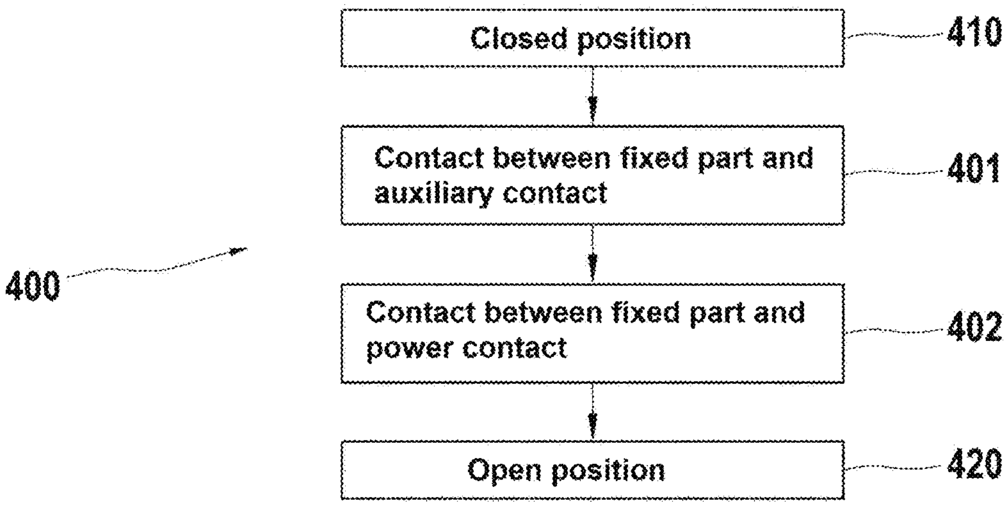

POWER CONTACTOR COMPRISING A PYROTECHNIC ACTUATOR

CROSS-REFERENCE TO RELATED APPLICATIONS

This is a National Stage Application under 35 U.S.C. § 371 of International Application No. PCT/FR2023/050005, filed Jan. 2, 2023, now published as WO 2023/135380 A1, which claims priority to French Patent Application No. 2200226, filed on Jan. 12, 2022.

TECHNICAL FIELD

This invention relates to the general field of electrical protection members, such as electromechanical contactors and electrical contactors, and more specifically to the triggering of the opening of these protection members.

PRIOR ART

Power contactors are electrical protection members generally composed of a fixed part and a movable part which can be in contact or not in contact with the fixed part.

To close a contactor, and thus put the movable part in contact on the fixed part so that an electric current can flow between the fixed part and the movable part, the motor of the contactor is powered, which will make it possible to apply a force to the movable part, and thus allow the flow of an electric current between the movable part and the fixed part.

When the current flowing between the two parts exceeds the defined threshold, electromagnetic repulsion forces will be applied to the movable part and compensate for, or even exceed, the force applied by the motor to the movable part. This causes a levitation of the contactor, i.e. an undesired opening of the contactor between the fixed and movable parts. In addition, during this phase, i.e. during the application of the repulsion forces before the levitation, the contact resistance between the fixed part and the movable part of the contactor increases and creates a local heating (proportional to the contact resistance squared multiplied by the current) which can cause the destruction of the movable part, irreversible damage to the contactor and/or the soldering of the movable part onto the fixed part if the movable part falls back onto the fixed part.

Currently to avoid damage to the contactors in the event of an overcurrent or a short circuit, several solutions exist:

- Measurements of the current flowing through the circuit are taken and a processing means detects currents above a given threshold to open the contactor before it levitates. However, the measurement acquisition, processing and action times are not always compatible with the dynamic current which can be extremely fast according to the impedance of the source or of the short circuit.
- The contactor may comprise a circuit breaking element but this complicates the structure of the contactor.
- The opening of the contactor can be triggered by a fast actuating means, for example of pyro-switch type, but the system for actuating and detecting the current can also be too slow according to certain dynamic currents.

It is therefore desirable to possess a new power contactor, for which the triggering of the opening is speeded up and the damage risks are reduced in the event of an overcurrent.

SUMMARY OF THE INVENTION

The invention relates to a power contactor comprising:

- a fixed part;

- a movable part able to come into contact with the fixed part and to move between an open position and a closed position of the contactor, the movable part comprising at least one power contact;
- an auxiliary contact and a pyrotechnic actuator, the auxiliary contact and the pyrotechnic actuator being placed in parallel with the power contact, and the pyrotechnic actuator being configured to be triggered during a levitation of the contactor in such a way as to move the contactor into the open position, and
- a motor configured to actuate the movable part and to put it in contact with the fixed part, characterized in that the power contact and the auxiliary contact are desynchronized in such a way that during the closure of the contactor, the power contact comes into contact with the fixed part before the auxiliary contact and during the opening of the contactor, the auxiliary contact opens before the power contact.

The presence of the pyrotechnic actuator makes it possible to open the power contact quickly, for example in less than 2 milliseconds, in the event of the contactor levitating.

Owing to the desynchronization of the power contact and the auxiliary contact, the pyrotechnic actuator can be powered via the auxiliary contact without risking the triggering or melting of the pyrotechnic actuator under nominal operation of the contactor. Thus, it is possible to use the contactor of the invention with a high voltage source, for example a source delivering a voltage of 800 V.

According to a particular feature of the invention, the contactor also comprises a transient-voltage-suppression diode in parallel with the pyrotechnic actuator.

The transient-voltage-suppression diode, also known as a transil diode or transzorb diode, makes it possible to limit the voltage across the terminals of the pyrotechnic actuator and to protect it in cases where the voltage would increase too quickly across the terminals of the power contact.

According to another particular feature of the invention, the pyrotechnic actuator comprises an igniter and a piston, the igniter being configured to trigger the pyrotechnic actuator by melting and release the piston to open the contactor.

Another subject of the invention is a method for closing a power contactor in the open position according to the invention, comprising the putting of the power contact in contact with the fixed part then the putting of the auxiliary contact in contact with the fixed part.

Another subject of the invention is a method for opening a power contactor in the closed position according to the invention, comprising the opening of the contact between the auxiliary contact and the fixed part, then the opening of the contact between the power contact and the fixed part.

Owing to the closing method of the invention, when the power contact is closed, the current flows through this contact and not through the pyrotechnic actuator. The voltage in the branch comprising the power contact is equal to the voltage drop of the power contact (in the order of a hundred millivolts). Then on closing the auxiliary contact, a small part of the current flows through the pyrotechnic actuator, since the voltage is imposed by the parallel branch comprising the power contact. This current is therefore not enough to trigger the pyrotechnic actuator.

At the opening of the contactor, the auxiliary contact opens first to be able to isolate the pyrotechnic actuator, then the power contact opens and electrical arcs are created. The voltage gradually rises in the two branches parallel to the voltage of the electrical source connected to the contactor, but the voltage across the terminals of the pyrotechnic actuator remains low.

When the contactor is closed, i.e. the power and auxiliary contacts are closed, and the electric current is too high, it is possible that the contactor will levitate, i.e. the power contact will be lifted up. Electric arcs can be created and an are voltage appears. The current in the branch comprising the pyrotechnic actuator increases and triggers the pyrotechnic actuator which will open the power contact. By opening the power contact during the levitation of the contactor, one avoids, inter alia, the power contact closing again and becoming soldered to the fixed part because of the local heating created by the current increase, which makes it possible to limit the damage to the contactor.

BRIEF DESCRIPTION OF THE DRAWINGS

Other features and advantages of this invention will become apparent from the description given below, with reference to the appended drawings which illustrate exemplary embodiments thereof without any limitation.

FIG. 1A represents, schematically and partially, a power contactor in the open position according to an embodiment of the invention.

FIG. 1B represents, schematically and partially, a power contactor between an open position and a closed position according to an embodiment of the invention.

FIG. 1C represents, schematically and partially, a power contactor in the closed position according to an embodiment of the invention.

FIG. 1D represents, schematically and partially, a power contactor in the open position according to an embodiment.

FIG. 2 represents, schematically and partially, a power contactor in the open position following the triggering of the pyrotechnic actuator according to an embodiment of the invention.

FIG. 3 represents, schematically, a method for closing a power contactor according to an embodiment of the invention.

FIG. 4 represents, schematically, a method for opening a power contactor according to an embodiment of the invention.

DESCRIPTION OF THE EMBODIMENTS

FIGS. 1A, 1B, 1C, 1D and 2 represent, schematically and partially, a power contactor 100 in different positions: in the open position, during a nominal operation of the contactor, in FIGS. 1A and 1D, in the closed position in FIG. 1C, between an open and a closed position in FIG. 1B and in the open position in FIG. 2 following the triggering of the pyrotechnic actuator 130. On these figures, the items are denoted by the same reference number.

The power contactor 100 comprises a fixed part 108 and a movable part 109 able to come into contact with the fixed part and move between an open position and a closed position of the contactor 100. The movable part of the contactor 100 comprises a movable power contact 110 and an auxiliary contact 120. The contactor 100 also comprises a pyrotechnic actuator 130 comprising an igniter. The auxiliary contact 120 and the pyrotechnic actuator 130, and more particularly the auxiliary contact 120 and the igniter (i.e. the trigger) of the pyrotechnic actuator 130 are placed in parallel with the movable power contact 110. In addition, the movable part may also comprise a resistance 140 placed in series between the auxiliary contact 120 and the pyrotechnic actuator 130.

The pyrotechnic actuator 130 is configured to be triggered during a levitation of the contactor 100, i.e. when electric arcs form between the movable part and the fixed part and when the movable part lifts when the electric current traversing the contactor 100 is too high, in such a way as to directly strike the entire movable part 109 or the movable power contact 110 alone, to open the contactor 100. For example, the pyrotechnic actuator 130 can be configured to be triggered at currents greater than or equal to 10 A.

The contactor 100 also comprises a motor 170, represented in FIG. 1D, configured to actuate the movable part and to put it in contact with the fixed part. The motor is for example a linear mechanical motor.

An electric charge 160 can be connected to the contactor 100.

The contactor 100 can be placed between a voltage source 150 and a load 160. The voltage source 150 can be a high voltage source which for example delivers a voltage of 800 V.

In the open position under nominal operation of the contactor 100, shown in FIG. 1A, the fixed part and the movable part are not in contact and no electric current flows between the two. In other words, the auxiliary 120 and power 110 contacts are open and no electric current can flow between the source 150 and the load 160. The voltage AU in the two branches (that comprising the power contact 110 and that comprising the auxiliary contact 120 and the pyrotechnic actuator 130) of the contactor 100 is equal to that of the voltage source 150.

When the contactor closes 100, the power 110 and auxiliary 120 contacts do not close at the same time. More specifically, the power contact 110 comes into contact with the fixed part of the contactor 100 before the auxiliary contact 120 when the contactor 100 closes. Similarly, when the contactor 100 opens, the power 110 and auxiliary 120 contacts do not open at the same time. More specifically, the auxiliary contact 120 opens before the power contact 110. In other words, the power 110 and auxiliary 120 contacts are desynchronized. This state of the contactor 100, between opening and closing, is illustrated on FIG. 1B.

The desynchronization of the power contact 110 and of the auxiliary contact 120 is for example effected by placing these contacts at different distances from the fixed part 108. In the open position of the contactor, the power contact is for example placed at a distance d1 from the fixed part and the auxiliary contact is placed at a distance d2 from the fixed part, the distance d2 being greater than the distance d1.

In the closed position of the contactor 100, represented in FIG. 1C, the fixed part and the movable part are in contact in such a way that an electric current flows between the two parts. In other words, the auxiliary 120 and power 110 contacts are closed and the electric current flows through both branches of the contactor 100.

When the contactor 100 is closed, the voltage in the branch comprising the power contact 110 is equal to the voltage drop of the power contact 110, i.e. in the order of a hundred millivolts. Then the auxiliary contact 120 closes and the voltage in the branch comprising the pyrotechnic actuator 130 is also of a hundred millivolts. The value of the resistance 140 is chosen in such a way that the current flowing through the pyrotechnic actuator 130 remains below the trigger threshold current of the pyrotechnic actuator 130. For example, the resistance 140 is of 2 Ohms.

When the contactor 100 opens, the auxiliary contact 120 opens first and makes it possible to isolate the igniter of the pyrotechnic actuator 130. Then the power contact 110 opens, electric arcs are created on this contact 110 and the voltage rises gradually in both branches of the contactor 100 until the voltage of the voltage source 150 is reached. Thus the voltage across the terminals of the pyrotechnic actuator 130 and the current traversing it are zero owing to the preliminary opening of the auxiliary contact 120.

Owing to the desynchronization of the contacts 110 and 120, the igniter of the pyrotechnic actuator 130 is never subjected to the voltage of the voltage source 150, and it is thus protected and does not run the risk of catching fire or being triggered inappropriately.

When the contactor 100 is closed and the current becomes too high, for example reaches 2 kA, the power contact 110 can be lifted up and make the contactor 100 levitate. This creates electric arcs and an are voltage appears. The voltage in the two parallel branches of the contactor 100 increases, along with the current flowing through the igniter of the pyrotechnic actuator 130. This has the effect of triggering the pyrotechnic actuator 130 which will open or prevent the closing of the power contact 110. The triggering of the opening of the contactor 100, in the event of levitation, is thus faster than the prior art, since it does not require any means for measuring the current or voltage. The triggering of the opening for example gains one millisecond in speed by comparison with the prior art.

In this exemplary embodiment, the pyrotechnic actuator 130 comprises an igniter 132 and a piston 131. When the current flowing through the pyrotechnic actuator 130 increases, the igniter 132 melts and triggers the pyrotechnic actuator 130 by releasing the piston 131. Being released, the piston 131 prevents the power contacts 110 from closing again, as illustrated on FIG. 2. This makes it possible to prevent the power contact 110 from dropping back onto the fixed part and being soldered to the fixed part following the levitation of the contactor 100. Thus, damage to the contactor 100 is avoided.

The contactor 100 may also comprise a transient-voltage-suppression diode (also known as a transil diode or transzorb diode), placed in parallel with the pyrotechnic actuator 130 and with the resistance 140. This diode makes it possible to limit the voltage to protect the igniter 132 and the resistance 140, particularly if the voltage increases too fast across the terminals of the power contact 110.

In addition, the contactor 100 has been described with a single power contact 110 and a single auxiliary contact 120, but it may comprise two or more power contacts which will always be desynchronized with respect to the auxiliary contact 120. In this case, the auxiliary contact 120 is always connected to the same pyrotechnic actuator 130 and the pyrotechnic actuator 130 actuates the different power contacts in a synchronized manner.

FIG. 3 represents, schematically, a method 300 for closing a power contactor according to an embodiment of the invention.

The contactor is initially in the open position 310, so the fixed and movable contacts are not in contact and no electric current flows between these two parts.

For the contactor to move into the closed position 320, the motor is powered in such a way as to apply a pressure force to the movable part of the contactor, and the power contact is first put in contact with the fixed part (step 301), then the auxiliary contact is put in contact with the fixed part (step 302).

FIG. 4 represents, schematically, a method 400 for opening a power contactor according to an embodiment of the invention.

The contactor is initially in the closed position 410, so the fixed and movable parts are in contact and an electric current flows between these two parts.

For the contactor to move into the open position 420, the power to the motor is cut and the auxiliary contact opens first (step 401). It is therefore no longer in contact with the fixed part of the contactor, then the power contact opens (step 402).

The invention claimed is:

1. A power contactor comprising:

a fixed part;

a movable part able to come into contact with the fixed part and to move between an open position and a closed position of the contactor, the movable part comprising at least one power contact;

an auxiliary contact and a pyrotechnic actuator, the auxiliary contact being in series with the pyrotechnic actuator, the auxiliary contact and the pyrotechnic actuator being placed in parallel with the power contact, and the pyrotechnic actuator being configured to be triggered during a levitation of the contactor in such a way as to move the contactor into the open position, and a motor configured to actuate the movable part and to put it in contact with the fixed part, characterized in that the power contact and the auxiliary contact are desynchronized in such a way that during the closure of the contactor, the power contact comes into contact with the fixed part before the auxiliary contact and during the opening of the contactor, the auxiliary contact opens before the power contact.

2. The power contact as claimed in claim 1, also comprising a transient-voltage-suppression diode in parallel with the pyrotechnic actuator.

3. The power contact as claimed in claim 1, wherein the pyrotechnic actuator comprises an igniter and a piston, the igniter being configured to trigger the pyrotechnic actuator by melting and release the piston to open the contactor.

4. A method for closing a power contactor in the open position as claimed in claim 1, comprising the putting of the power contact in contact with the fixed part then the putting of the auxiliary contact in contact with the fixed part.

5. A method for opening a power contactor in the closed position as claimed in claim 1, comprising the opening of the contact between the auxiliary contact and the fixed part, then the opening of the contact between the power contact and the fixed part.

* * * * *